United States Patent [19]

Horbaschek

[11] Patent Number: 5,128,764
[45] Date of Patent: Jul. 7, 1992

[54] LEVEL CORRECTING CIRCUIT HAVING SWITCHED STAGES OF DIFFERING TIME CONSTANTS

[75] Inventor: Heinz Horbaschek, Erlangen, Fed. Rep. of Germany

[73] Assignee: Siemens Aktiengesellschaft, Munich, Fed. Rep. of Germany

[21] Appl. No.: 586,873

[22] Filed: Sep. 24, 1990

[51] Int. Cl.$^5$ ............................................. H04N 5/18
[52] U.S. Cl. ....................................... 358/171; 358/34
[58] Field of Search ................ 358/171, 172, 173, 34

[56] References Cited

U.S. PATENT DOCUMENTS

| | | | |
|---|---|---|---|
| 4,516,042 | 5/1985 | Nakamura | 358/172 X |
| 4,707,741 | 11/1987 | Stratton | 358/171 |
| 4,716,461 | 12/1981 | Hinn | 358/172 X |
| 4,729,026 | 3/1988 | Suzuki et al. | 358/168 |
| 4,797,744 | 1/1989 | Klemmer et al. | 358/34 X |
| 4,811,087 | 3/1989 | Engel et al. | 358/172 X |

FOREIGN PATENT DOCUMENTS

| | | |
|---|---|---|
| 3535570 | 4/1987 | Fed. Rep. of Germany . |
| 57-131175 | 8/1982 | Japan ........................ 358/172 |
| 61-148973 | 7/1986 | Japan . |
| 61-212169 | 9/1986 | Japan . |
| 63-287266 | 11/1988 | Japan . |
| 2-9275 | 1/1990 | Japan . |

OTHER PUBLICATIONS

"Fernsehtechnik Ohne Ballast", Linmann, 12th Edition, p. 257, FIG. 14.43.

Primary Examiner—James J. Groody
Assistant Examiner—Mark R. Powell
Attorney, Agent, or Firm—Hill, Van Santen, Steadman & Simpson

[57] ABSTRACT

A circuit for switching a video signal to a reference level, known as a "clamp circuit," minimizes changes in the basic brightness of the lines which occur during the retrace interval. The circuit includes first and second circuit stages operating with different time constants to supply the video signal to the video output tube. The first circuit stage is activated during a first chronological duration of the pulse pause of the video signal, so that the video signal is switched to a reference level. The second circuit stage is activated during a second chronological duration of the pulse pause, following the first chronological duration, so that the video signal is switched to the same or to a different reference level.

4 Claims, 3 Drawing Sheets (RPIOR ART)

LEVEL CORRECTING CIRCUIT HAVING SWITCHED STAGES OF DIFFERING TIME CONSTANTS

BACKGROUND OF THE INVENTION

1. Field of the Invention

The present invention is directed to a circuit for switching a video signal to a reference level for controlling the brightness of the picture screen of a video output tube. Such circuits are known as clamp circuits.

2. Description of the Prior Art

The picture of a video output tube is constructed of individual lines, which are in turn composed of successive picture elements. These lines are scanned by an electron beam by applying appropriate control signals to the electron gun of a video output tube. The brightness of the picture elements of each line is controllable by applying a control voltage to a control grid of the video output tube. This control voltage, which is the video signal, contains the information for a line which is to be pictorially displayed. The image at the picture screen of the video output tube is derived from the total of all line signals. These video signals are broadband signals consisting of pulses separated by pulse pauses, with the maximum black signal, the "black value signal," being set at the picture screen of the video output tube given a small amplitude of the video signal, i.e., when the signal corresponds to a reference level. A bright (white) signal is set at the picture screen of the video output tube when the amplitude reaches a maximum value. Signal amplitudes in between these values are portrayed as "gray signals."

A conventional video signal is shown in FIG. 1 on the basis of which the image at the picture screen of the video output tube appears white in the upper image half and appears black in the lower image half. The period of the signal is referenced $T_s$, with the signal consisting of individual pulses having respective chronological durations $T_w$ and $T_s$. During the time $T_w$, a white picture signal is generated, whereas during the time $T_s$ a black picture signal is generated. During a time $T_y$, the electron beam is switched to "dark," i.e. to a reference level which corresponds to the "black value signal" and is returned to the start of the first picture line.

The same signal is shown with an expanded time frame in FIG. 2, wherein it can be seen that the signal in each duration $T_w$ and $T_s$ consists of a series of pulses separated by pulse pauses. Each pulse has a chronological duration $T_z$, during which the electron beam is deflected along a line of the picture screen, and the electron beam is switched to "dark" during each pulse pause, i.e., during each chronological duration $T_H$, and is driven to the start of the next line (retrace interval). During this time, the video signal is applied to the reference level which corresponds to the black value signal for "switching" the electron beam to "dark."

Due to their lower bandwidth limitation, video amplifiers which are usually used for this purpose are not capable of properly transmitting DC voltage components as well as voltages having low frequency. These voltages must then be reconstructed with appropriate circuits, known as clamp circuits. Without this correction, low frequency voltages are superimposed on the video signal which cause the reference level to vary dependent on the previous signal values upon each switch to "dark." This causes the basic brightness of each line to be slightly different, and line noise thus arises, which is undesirable. A basic clamp circuit is described, for example, in the book "Fernsehtechnik ohne Ballast," Limann, 12th Edition, page 257, FIG. 17.43.

FIG. 3 shows a schematic illustration of a circuit operating according to known principles for cancelling this undesired effect. Given optimum dimensioning of this circuit, the generator resistance of the first amplifier $V_1$ should be optimally low, the resistor R in combination with the coupling capacitance $C_k$ should have a short time constant, and the internal resistance of the followers amplifier $V_2$ should be optimally high. Undesirable low frequency signal components which are produced by the image content, and superimpositions of noise frequencies such as microphonics or radiated interference should be suppressed.

As can be seen in FIG. 4, noise influences due, for example, to the line deflection, occur particularly at the start of the pulse pause having the chronological duration $T_H$ in the video nal, so that the switch S shown in FIG. 3 can be driven only during a short time span at the end of this pulse pause. Drive of the switch S during the entire pulse pause can result in the capacitor $C_k$ not being completely discharged to the reference potential U. The reference levels at the start of the lines are thus different, thus causing line noise.

The drive pulse $I_A$ for the switch S is shown in FIG. 5. The chronological duration of this pulse must be such that the capacitor $C_k$ can accept the reference potential U, and thus can assume the desired initial value for the following line. To this end, the time constant of the circuit shown in FIG. 3 should be maintained optimally short, so that a full charge reversal of the capacitor $C_k$ can occur given high noise frequency amplitudes and given a single drive pulse $I_A$.

Noise signals deriving from the video pre-amplifier $V_1$, however, are superimposed on the video signal. These noise signals result, given extremely short drive pulses $I_A$ and given the low time constant of the circuit, in the capacitor $C_k$ not assuming the reference level, but instead assuming a voltage level which is modified by the momentary noise level. A reference potential falsified by the noise level is thus present for the next following line. This reference potential changes for each line due to the statistical change in the noise level, so that line noise again arises. For this reason, the time constant of the circuit of FIG. 3 is usually increased in comparison to the aforementioned, ideal case, so that the noise level can be averaged out during the pulse pause. A compromise must therefore be sought in the selection of the time constants of the circuit, so that the noise frequencies are still adequately suppressed and the line noise does not become visible.

SUMMARY OF THE INVENTION

It is an object of the present invention to provide a clamp circuit wherein noise frequencies are optimally suppressed and line noise is not visible.

The above object is achieved in a circuit arrangement constructed in accordance with the principles of the present invention for switching a video signal to a reference level, wherein the circuit arrangement includes first and second circuit stages having different time constants. The video signal includes a pulse and a pulse pause, and the first circuit stage is effective during a first chronological duration of the pulse pause, and the second circuit stage is effective during a second chronological duration of the pulse pause, following the first chronological duration. The first and second circuit stages switch the video signal to different reference levels, or to the same reference level.

An advantage of the circuit disclosed herein is that the noise frequencies are optimally suppressed by the first circuit stage during the first chronological duration of the pulse pause on the basis of a suitable selection of the time constant of this stage, and the second circuit stage is dimensioned so that no line noise arises and is effective during the second chronological duration of the pulse pause. It is preferable that the time constant of the first circuit stage be shorter than the time constant of the second circuit stage, and that the first chronological duration of the pulse pause be longer than the second chronological duration.

DESCRIPTION OF THE PREFERRED EMBODIMENTS

Figure 1:
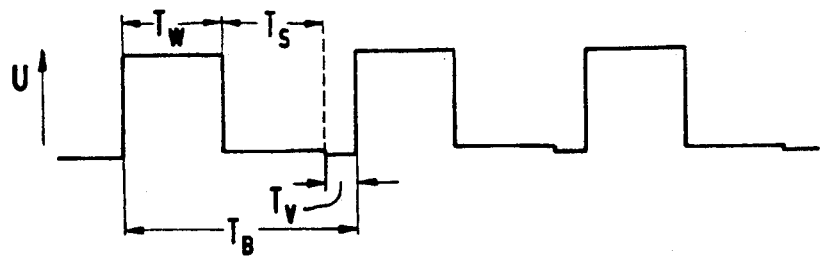
FIGS. 1, 2, 4 and 5 show signals for explaining the operation of this conventional circuit.
Figure 2:
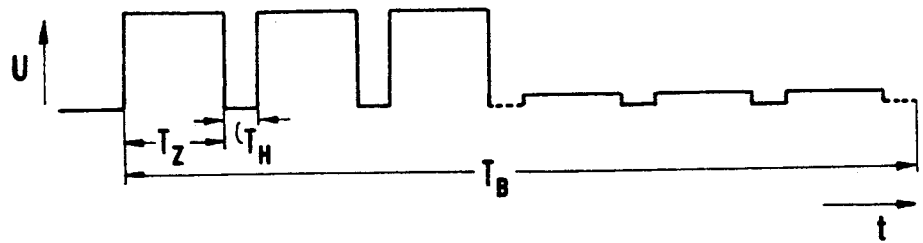
Figure 6:
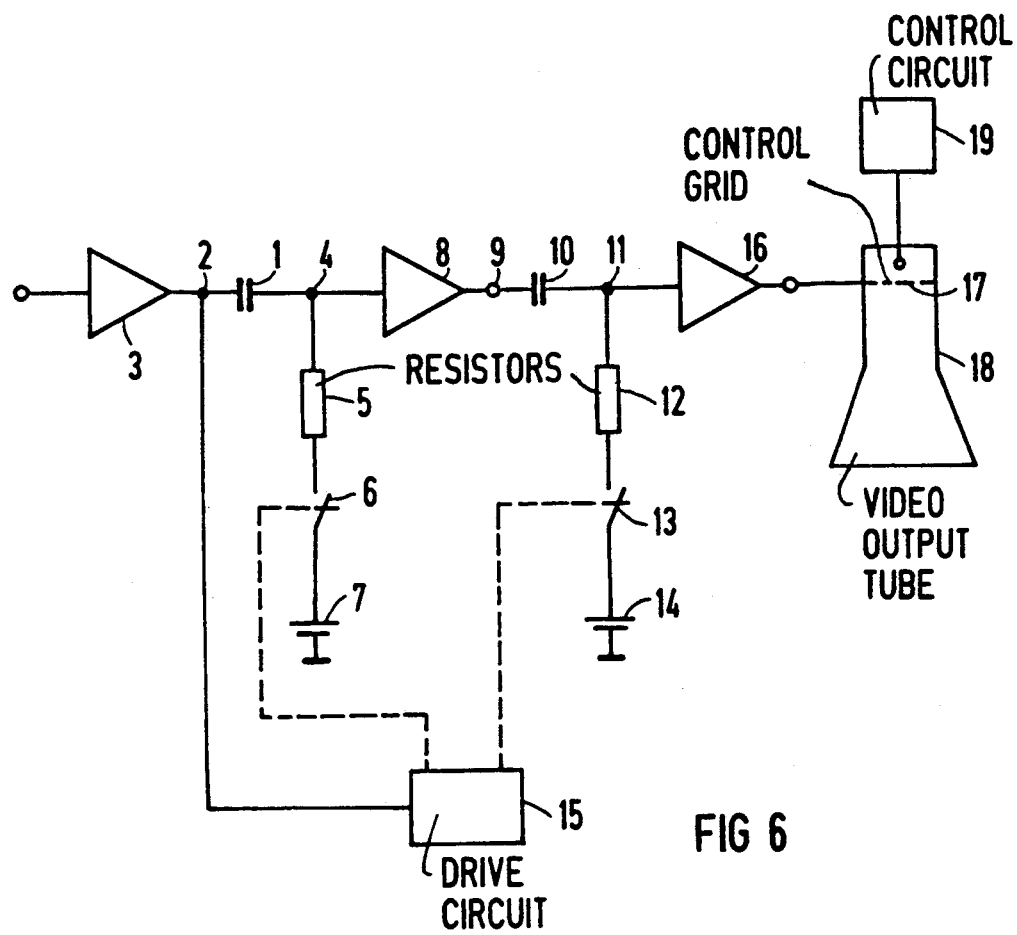
FIG. 6 is a schematic circuit diagram of a clamp circuit constructed in accordance with the principles a first embodiment of the present invention.
Figure 3:
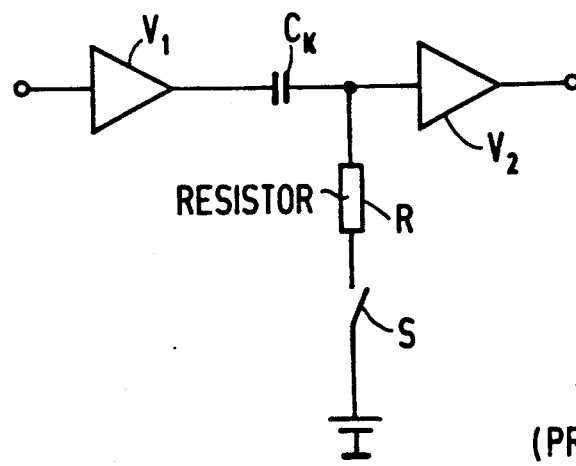
FIG. 3 is a circuit diagram of a conventional clamp circuit.

A circuit in with arrangement constructed accordance the principles of the present invention for switching a conventional video signal, of the type shown in FIGS. 1 and 2, to a reference level, is shown in FIG. 6. The circuit includes a capacitor 1 having a first terminal 2 to which the video signal is supplied via a first amplifier 3. The capacitor 1 has a second terminal 4 connectable to a voltage source 7 via a resistor 5 and a switch 6. The capacitor 1, the resistor 5 and the switch 6 form a first circuit stage of the circuit. The capacitor 1 and the resistor 5 define the time constant of this first circuit stage.

The second terminal 4 of the first capacitor 1 is connected to a first terminal 9 of a second capacitor 10 via a second amplifier 8, which functions as a decoupling element due to a high input impedance and a low output impedance. A voltage source 14 is connectable to the second terminal 11 of the second capacitor 10 via a resistor 12 and a switch 13. The capacitor 10, the resistor 12 and the switch 13 form a second circuit stage. The capacitor 10 and the resistor 12 define the time constant of the second circuit stage.

The voltage of the voltage source 14 is set to the reference level for the black value signal. The voltage of the voltage source 7, for example, may also be set to the reference level of the black value signal, or may be set to a level differing therefrom.

A drive circuit 15, having an input to which the video signal is supplied, is provided for driving the switches 6 and 13. The output signal of the drive circuit 15 is shown in FIGS. 7 and 8.

Although not essential to the invention, it is shown in FIG. 6 that the second terminal 11 of the second capacitor is connected via a further amplifier 16 to a control grid 17 of video output tube 18. A control circuit 19 is provided for operating the video output tube 18.

Figure 4:
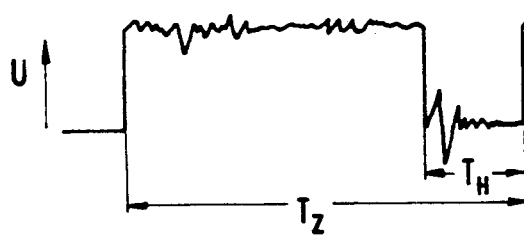
Figure 5:
Figure 7:
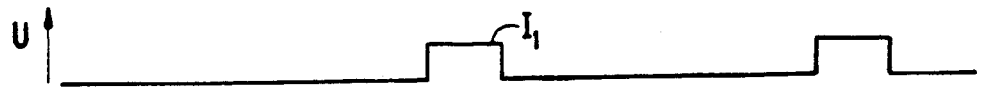
FIGS. 7 and 8 are voltage/time diagrams of signals for explaining the operation of the circuit of FIG. 6.
Figure 8:

The signal for driving the switch 6 is shown in FIG. 7, and causes the switch 6 to be closed during a first chronological duration, i.e., the chronological duration of the pulse $I_1$ of the drive circuit 15. The drive signal for the switch 13 is shown in FIG. 8, which causes the switch 13 to be closed during a second chronological duration, i.e., the chronological duration of the pulse $I_2$ of the drive circuit 15. It must be assured that the pulses $I_1$ and $I_2$ occur during the pulse pause $T_H$ (FIG. 4) of the video signal. For this reason, the video signal is supplied to the input of the drive circuit 15 for synchronization.

The first circuit stage is activated during the drive of the switch 6 by the pulse $I_1$ so that, as a result of the low time constant of this circuit stage in combination with the relatively long duration of the pulse $I_1$, existing noise is integrated and low-frequency noise frequencies are suppressed. The switch 13 is then closed and the switch 6 is opened during the pulse $I_2$, so that the second circuit stage is activated. Compared to the first circuit stage, the second circuit stage has a high time constant, so that the video signal is switched to the reference potential prescribed by the voltage source 14, which corresponds to the black value signal, for the duration of the pulse $I_2$. The time constant of the second circuit stage and the duration of the pulse $I_2$ are dimensioned so that no line noise can arise, despite the relatively short duration of the pulse $I_2$. To this end, the pulse $I_2$ occurs at the end of the pulse pause $T_H$ of the video signal, and its duration is short in comparison to the duration of the pulse $I_1$.

It important for the circuit of FIG. 6 that the first circuit stage have a low time constant in the range from about 1µs through about 10µs, preferably 4µs, and that the second circuit stage have a higher time constant in the range of from about 10 ms through about 200 ms, preferably 100 ms. The stages having these respective time constants are respectively activated in successive first and second chronological durations of the pulse pause of the video signal, the stages switching the video signal to a reference potential during these times. For optimum functioning of the circuit, the output impedance of the amplifiers should be low, preferably less than 100 ohms, and the input impedance of the amplifiera should be high, preferably above 100 Kohm.

Figure 9:
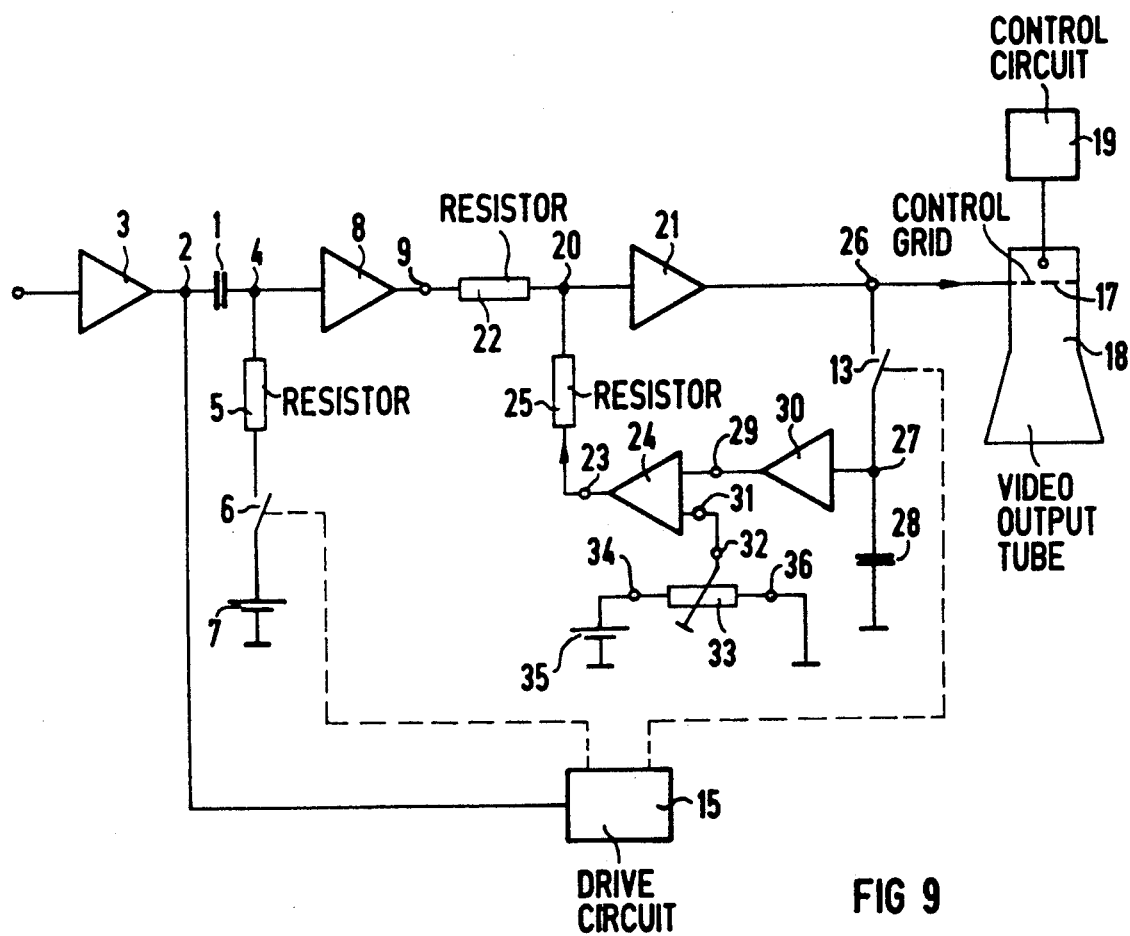
FIG. 9 is a schematic circuit diagram of a clamp circuit constructed in accordance with the principles of a second embodiment of the present invention.

An alternative embodiment of the present inventions shown in FIG. 9. Elements which are shown in FIG. 6 have the same reference number in FIG. 9. In this embodiment the second circuit stage is formed by a black value regulation circuit. The input 20 of an amplifier 21 of this black value regulation circuit is connected to the second terminal 4 of the first capacitor 1 via a resistor 22 and amplifier 8 and is connected to output 23 of an regulation amplifier 24 via a resistor 25. The output 26 of amplifier 21 is connected to a control grid 17 of the video output tube 18 and id connected to a first terminal 27 of a capacitor 28 via switch 13. The switch 13 is driven for the duration of the pulse $I_2$ by the dive circuit 15. The first terminal 27 of capacitor 28 is connected to a first input terminal 29 o regulation amplifier 24 via an amplifier 30 which is an impedance transformer. A second input terminal 31 of regulation amplifier 24 is connected to a first terminal 32 of a regulation resistor 33. A second terminal 34 of said regulation resistor 33 is connected to a first terminal of a voltage source 35. A second terminal of the voltage source 35, a third terminal 36 of regulation resistor 33 and a second terminal of capacitor 28 is connected to a base (ground) potential. The normal value of the black value signal is st by adjustment of regulation resistor 33. The feed-back lop of the black value regulation circuit, which consists of switch 13, capacitor 28, amplifier 30, regulation amplifier 24, regulation resistor 33 and resistor 25 regulates the black value signal such that it is constant.

The circuit can be used not only in video output tubes such as picture tubes for a monitor, but can be sued at some other location of a video amplifier chain between the picture camera and the picture tube, for example in image memories and the like, wherein the same problem exists. In general, the circuit disclosed herein can be used at any location wherein disturbing noise signals unfavorably influence a signal and wherein a reference potential is to be observed.

Although modifications and changes may be suggested by those skilled in the art, it is the intention of the inventor to embody within the patent warranted herein all changes and modifications as reasonably and properly come within the scope of his continuation to the art.

I claim as my invention:

1. A circuit for switching a video signal, consisting of pulses separated by pulse pauses, to a reference level, comprising:
   a first circuit stage to which said video signal is supplied, said first circuit stage having a first time constant;
   a second circuit stage to which the output of said first circuit stage us supplied, said second circuit stage having a second time constant;
   said first circuit stage switching said video signal o a first reference level when activated and said second circuit stage switching said video signal to a second reference level, when activated; and
   means for activating said first circuit stage during a first chronological duration of said pulse pause and for activating said second circuit stage during a second chronological duration of said pulse pause following said fist chronological duration, said first chronological duration being longer than said second chronological duration.

2. A circuit as claimed in claim 1 wherein said first time constant is lower than said second time constant.

3. A circuit as claimed in claim 1 wherein said first and second reference levels are the same.

4. A circuit as claimed in claim 1 wherein said second circuit stage is a black value regulating circuit.

* * * * *